US012633554B2

(12) United States Patent
Yang et al.

(10) Patent No.: US 12,633,554 B2
(45) Date of Patent: May 19, 2026

(54) FUEL CELL PERFORMANCE OPTIMIZATION METHODOLOGY COMBINED WITH SIMULATION AND EXPERIMENT

(71) Applicant: CATARC New Energy Vehicle Test Center (Tianjin) Co., Ltd., Tianjin (CN)

(72) Inventors: Zirong Yang, Tianjin (CN); Dong Hao, Tianjin (CN); Yanyi Zhang, Tianjin (CN); Hao Lan, Tianjin (CN); Jia Wang, Tianjin (CN); Daokuan Jiao, Tianjin (CN); Xin Zhao, Tianjin (CN); Minghui Ma, Tianjin (CN); Xuefeng Ji, Tianjin (CN)

(73) Assignee: CATARC NEW ENERGY VEHICLE TEST CENTER (TIANJIN) CO., LTD., Tianjin (CN)

( * ) Notice: Subject to any disclaimer, the term of this patent is extended or adjusted under 35 U.S.C. 154(b) by 882 days.

(21) Appl. No.: 17/970,246

(22) Filed: Oct. 20, 2022

(65) Prior Publication Data

US 2023/0420709 A1 Dec. 28, 2023

(30) Foreign Application Priority Data

Jun. 27, 2022 (CN) .......................... 202210732824.2

(51) Int. Cl.
*G06F 7/48* (2006.01)
*H01M 8/04298* (2016.01)
*H01M 8/04537* (2016.01)

(52) U.S. Cl.
CPC ... *H01M 8/04305* (2013.01); *H01M 8/04552* (2013.01)

(58) Field of Classification Search
CPC ......... H01M 8/04305; H01M 8/04552; H01M 8/04559; H01M 8/04589; H01M 8/04992; Y02E 60/50
See application file for complete search history.

(56) References Cited

U.S. PATENT DOCUMENTS

2010/0227236 A1* 9/2010 Mayorga Lopez ..........................
H01M 8/04552
429/428
2015/0278704 A1* 10/2015 Kim ........................ G06F 30/20
703/2

OTHER PUBLICATIONS

First Office Action in corresponding Chinese Application No. 202210732824 .2, dated Aug. 5, 2022; 8 pgs.

(Continued)

*Primary Examiner* — Nithya J. Moll
(74) *Attorney, Agent, or Firm* — PORUS IP LLC

(57) ABSTRACT

The present disclosure provides a fuel cell performance optimization methodology combined with simulation method and experimental method, comprising: with the mutual coupling of simulation and experiment, a fuel cell simulation model is established, a bench test is performed, the model is calibrated, the operating conditions are refined and simulation and analysis are performed, and the optimal operating condition is obtained to perform the bench test, the optimal actual output voltage of the fuel cell is obtained, and the output voltage optimization result of the fuel cell are verified. The present disclosure not only reduces the number of experiments and experiment cycles in the process of fuel cell operation condition optimization, but also improves the reliability and accuracy of simulation results, and better plays the role of simulation in optimization.

8 Claims, 12 Drawing Sheets

(56)  References Cited

OTHER PUBLICATIONS

Search Report in corresponding Chinese Application No. 202210732824
.2, dated Jul. 15, 2022; 3 pgs.

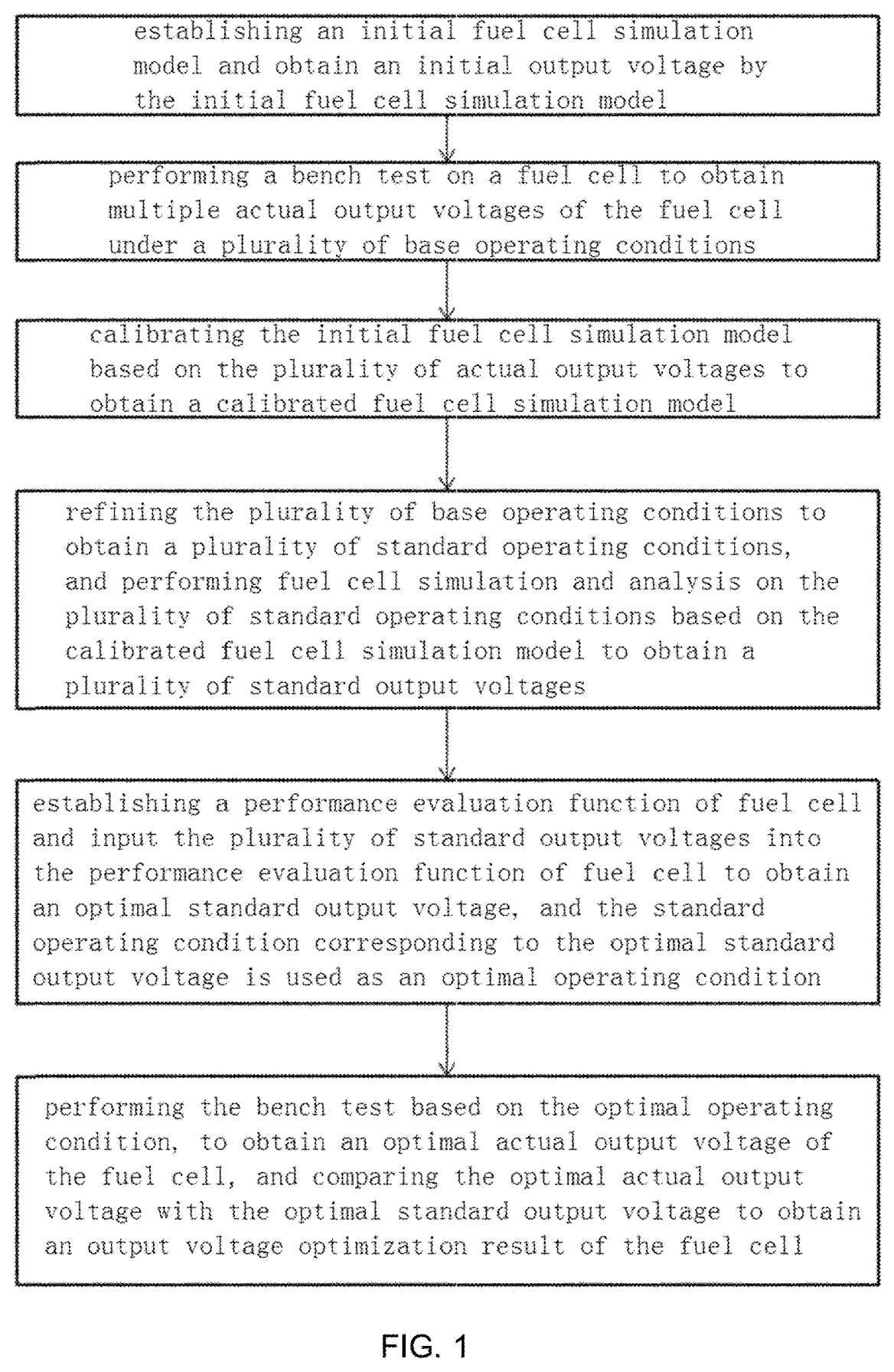

* cited by examiner establishing an initial fuel cell simulation
model and obtain an initial output voltage by
the initial fuel cell simulation model performing a bench test on a fuel cell to obtain
multiple actual output voltages of the fuel cell
under a plurality of base operating conditions calibrating the initial fuel cell simulation model
based on the plurality of actual output voltages to
obtain a calibrated fuel cell simulation model refining the plurality of base operating conditions to
obtain a plurality of standard operating conditions,
and performing fuel cell simulation and analysis on the
plurality of standard operating conditions based on the
calibrated fuel cell simulation model to obtain a
plurality of standard output voltages establishing a performance evaluation function of fuel cell
and input the plurality of standard output voltages into
the performance evaluation function of fuel cell to obtain
an optimal standard output voltage, and the standard
operating condition corresponding to the optimal standard
output voltage is used as an optimal operating condition performing the bench test based on the optimal operating
condition, to obtain an optimal actual output voltage of
the fuel cell, and comparing the optimal actual output
voltage with the optimal standard output voltage to obtain
an output voltage optimization result of the fuel cell

FIG. 1

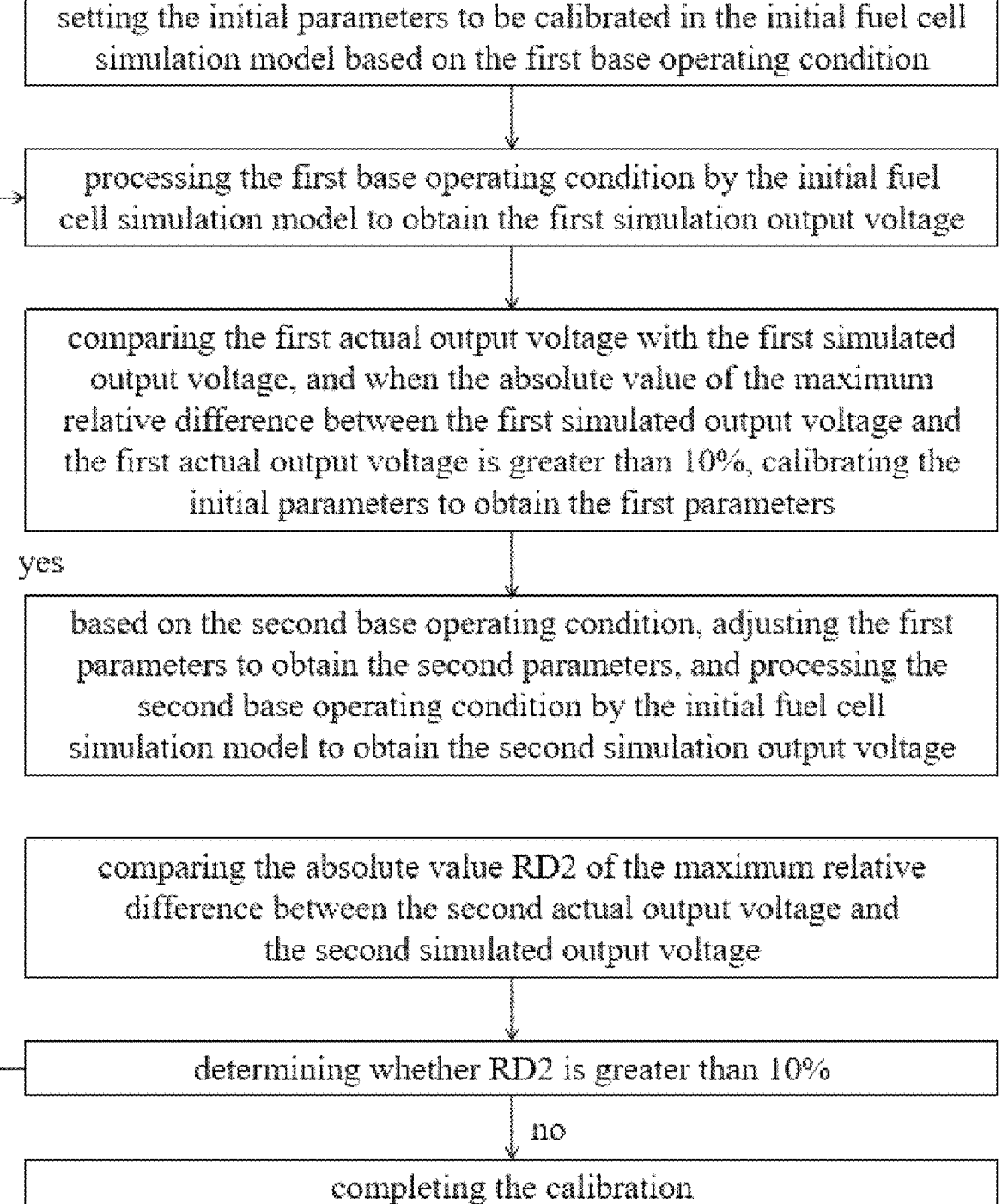

setting the initial parameters to be calibrated in the initial fuel cell simulation model based on the first base operating condition processing the first base operating condition by the initial fuel cell simulation model to obtain the first simulation output voltage comparing the first actual output voltage with the first simulated output voltage, and when the absolute value of the maximum relative difference between the first simulated output voltage and the first actual output voltage is greater than 10%, calibrating the initial parameters to obtain the first parameters yes based on the second base operating condition, adjusting the first parameters to obtain the second parameters, and processing the second base operating condition by the initial fuel cell simulation model to obtain the second simulation output voltage comparing the absolute value RD2 of the maximum relative difference between the second actual output voltage and the second simulated output voltage determining whether RD2 is greater than 10% no completing the calibration

FIG. 2

| current density | 50% 70°C | | | | 60% 70°C | | | | 70% 70°C | | | | 80% 70°C | | | | 90% 70°C | | | |
|---|---|---|---|---|---|---|---|---|---|---|---|---|---|---|---|---|---|---|---|---|
| | 1.5 | 1.8 | 2 | 2.5 | 1.5 | 1.8 | 2 | 2.5 | 1.5 | 1.8 | 2 | 2.5 | 1.5 | 1.8 | 2 | 2.5 | 1.5 | 1.8 | 2 | 2.5 |
| 0.01 | 0.924 | 0.926 | 0.928 | 0.933 | 0.922 | 0.928 | 0.929 | 0.933 | 0.920 | 0.925 | 0.927 | 0.930 | 0.920 | 0.923 | 0.924 | 0.927 | 0.919 | 0.923 | 0.924 | 0.926 |
| 0.05 | 0.888 | 0.892 | 0.895 | 0.900 | 0.892 | 0.898 | 0.896 | 0.903 | 0.889 | 0.895 | 0.897 | 0.901 | 0.890 | 0.893 | 0.894 | 0.897 | 0.888 | 0.893 | 0.893 | 0.895 |
| 0.1 | 0.864 | 0.869 | 0.872 | 0.878 | 0.874 | 0.881 | 0.876 | 0.885 | 0.872 | 0.877 | 0.879 | 0.884 | 0.874 | 0.877 | 0.878 | 0.881 | 0.873 | 0.877 | 0.878 | 0.880 |
| 0.2 | 0.841 | 0.835 | 0.838 | 0.851 | 0.853 | 0.858 | 0.851 | 0.861 | 0.852 | 0.856 | 0.857 | 0.863 | 0.852 | 0.858 | 0.858 | 0.861 | 0.855 | 0.857 | 0.861 | 0.862 |
| 0.4 | 0.810 | 0.797 | 0.801 | 0.806 | 0.818 | 0.818 | 0.820 | 0.815 | 0.818 | 0.823 | 0.825 | 0.830 | 0.818 | 0.824 | 0.824 | 0.830 | 0.819 | 0.824 | 0.826 | 0.829 |
| 0.6 | 0.773 | 0.767 | 0.762 | 0.762 | 0.781 | 0.788 | 0.789 | 0.788 | 0.781 | 0.787 | 0.789 | 0.794 | 0.782 | 0.788 | 0.790 | 0.794 | 0.783 | 0.789 | 0.791 | 0.794 |
| 0.8 | 0.745 | 0.738 | 0.733 | 0.726 | 0.747 | 0.755 | 0.758 | 0.758 | 0.748 | 0.755 | 0.758 | 0.763 | 0.749 | 0.756 | 0.758 | 0.763 | 0.750 | 0.757 | 0.759 | 0.763 |
| 1 | 0.713 | 0.712 | 0.708 | 0.697 | 0.714 | 0.723 | 0.726 | 0.730 | 0.715 | 0.724 | 0.727 | 0.732 | 0.717 | 0.725 | 0.728 | 0.733 | 0.718 | 0.726 | 0.730 | 0.734 |
| 1.2 | 0.679 | 0.684 | 0.680 | 0.670 | 0.680 | 0.691 | 0.694 | 0.698 | 0.682 | 0.692 | 0.696 | 0.701 | 0.683 | 0.694 | 0.697 | 0.703 | 0.685 | 0.695 | 0.699 | 0.705 |
| 1.4 | 0.643 | 0.652 | 0.652 | 0.641 | 0.644 | 0.656 | 0.660 | 0.665 | 0.646 | 0.658 | 0.663 | 0.669 | 0.648 | 0.660 | 0.665 | 0.671 | 0.647 | 0.660 | 0.665 | 0.673 |
| 1.6 | 0.601 | 0.614 | 0.616 | 0.611 | 0.603 | 0.618 | 0.623 | 0.629 | 0.606 | 0.621 | 0.626 | 0.633 | 0.607 | 0.623 | 0.628 | 0.636 | 0.611 | 0.626 | 0.631 | 0.640 |
| 1.8 | 0.551 | 0.567 | 0.572 | 0.572 | 0.556 | 0.573 | 0.579 | 0.586 | 0.558 | 0.578 | 0.584 | 0.592 | 0.553 | 0.572 | 0.579 | 0.590 | 0.571 | 0.588 | 0.595 | 0.604 |

FIG. 6A

| current density | 50% 80°C | | | | 60% 80°C | | | | 70% 80°C | | | | 80% 80°C | | | | 90% 80°C | | | |
|---|---|---|---|---|---|---|---|---|---|---|---|---|---|---|---|---|---|---|---|---|
| | 1.5 | 1.8 | 2 | 2.5 | 1.5 | 1.8 | 2 | 2.5 | 1.5 | 1.8 | 2 | 2.5 | 1.5 | 1.8 | 2 | 2.5 | 1.5 | 1.8 | 2 | 2.5 |
| 0.01 | 0.917 | 0.922 | 0.922 | 0.926 | 0.916 | 0.921 | 0.923 | 0.925 | 0.913 | 0.918 | 0.919 | 0.923 | 0.909 | 0.914 | 0.916 | 0.918 | 0.910 | 0.912 | 0.912 | 0.915 |
| 0.05 | 0.894 | 0.890 | 0.889 | 0.894 | 0.885 | 0.890 | 0.892 | 0.894 | 0.881 | 0.887 | 0.888 | 0.892 | 0.877 | 0.882 | 0.884 | 0.887 | 0.878 | 0.881 | 0.881 | 0.884 |
| 0.1 | 0.862 | 0.870 | 0.867 | 0.873 | 0.867 | 0.871 | 0.874 | 0.875 | 0.864 | 0.869 | 0.871 | 0.874 | 0.860 | 0.865 | 0.867 | 0.870 | 0.862 | 0.864 | 0.864 | 0.867 |
| 0.2 | 0.831 | 0.843 | 0.836 | 0.844 | 0.845 | 0.847 | 0.851 | 0.850 | 0.842 | 0.847 | 0.851 | 0.853 | 0.836 | 0.844 | 0.846 | 0.851 | 0.838 | 0.846 | 0.844 | 0.847 |
| 0.4 | 0.791 | 0.799 | 0.793 | 0.805 | 0.802 | 0.812 | 0.808 | 0.814 | 0.808 | 0.814 | 0.815 | 0.820 | 0.805 | 0.811 | 0.816 | 0.820 | 0.807 | 0.812 | 0.813 | 0.817 |
| 0.6 | 0.751 | 0.752 | 0.758 | 0.751 | 0.767 | 0.770 | 0.772 | 0.771 | 0.770 | 0.778 | 0.781 | 0.783 | 0.770 | 0.776 | 0.780 | 0.784 | 0.770 | 0.777 | 0.780 | 0.783 |
| 0.8 | 0.715 | 0.718 | 0.716 | 0.717 | 0.738 | 0.741 | 0.743 | 0.742 | 0.739 | 0.748 | 0.751 | 0.755 | 0.737 | 0.746 | 0.750 | 0.755 | 0.740 | 0.747 | 0.749 | 0.754 |
| 1 | 0.687 | 0.684 | 0.683 | 0.683 | 0.709 | 0.714 | 0.715 | 0.716 | 0.708 | 0.719 | 0.723 | 0.728 | 0.707 | 0.718 | 0.722 | 0.728 | 0.714 | 0.721 | 0.725 | 0.730 |
| 1.2 | 0.658 | 0.657 | 0.654 | 0.653 | 0.679 | 0.689 | 0.690 | 0.690 | 0.678 | 0.690 | 0.695 | 0.701 | 0.678 | 0.690 | 0.694 | 0.701 | 0.678 | 0.691 | 0.696 | 0.702 |
| 1.4 | 0.628 | 0.628 | 0.626 | 0.621 | 0.648 | 0.660 | 0.664 | 0.664 | 0.647 | 0.662 | 0.667 | 0.674 | 0.650 | 0.665 | 0.667 | 0.675 | 0.645 | 0.661 | 0.667 | 0.675 |
| 1.6 | 0.602 | 0.600 | 0.597 | 0.593 | 0.614 | 0.630 | 0.635 | 0.639 | 0.613 | 0.631 | 0.637 | 0.646 | 0.616 | 0.634 | 0.640 | 0.649 | 0.610 | 0.631 | 0.638 | 0.648 |
| 1.8 | 0.571 | 0.571 | 0.571 | 0.586 | 0.578 | 0.598 | 0.603 | 0.609 | 0.578 | 0.599 | 0.606 | 0.616 | 0.579 | 0.602 | 0.609 | 0.619 | 0.574 | 0.600 | 0.608 | 0.619 |

FIG. 6B

| operating condition | Temperature | 50% | | | | 60% | | | | 70% | | | | 80% | | | | 90% | | | |
|---|---|---|---|---|---|---|---|---|---|---|---|---|---|---|---|---|---|---|---|---|---|
| | | 1.5 | 1.8 | 2 | 2.5 | 1.5 | 1.8 | 2 | 2.5 | 1.5 | 1.8 | 2 | 2.5 | 1.5 | 1.8 | 2 | 2.5 | 1.5 | 1.8 | 2 | 2.5 |
| Evaluation function | 70°C | 0.680 | 0.683 | 0.684 | 0.683 | 0.685 | 0.694 | 0.698 | 0.700 | 0.686 | 0.698 | 0.702 | 0.708 | 0.685 | 0.696 | 0.700 | 0.708 | 0.692 | 0.703 | 0.707 | 0.713 |
| | 80°C | 0.674 | 0.676 | 0.673 | 0.675 | 0.686 | 0.700 | 0.700 | 0.704 | 0.688 | 0.701 | 0.705 | 0.712 | 0.687 | 0.701 | 0.706 | 0.713 | 0.686 | 0.701 | 0.706 | 0.712 |

FIG. 7

FUEL CELL PERFORMANCE OPTIMIZATION METHODOLOGY COMBINED WITH SIMULATION AND EXPERIMENT

RELATED APPLICATIONS

The present application claims priority from Chinese Application Number 202210732824.2, filed Jun. 27, 2022, the disclosure of which is hereby incorporated by reference herein in its entirety.

FIELD

The present disclosure relates to the field of proton exchange membrane fuel cells, and specially relates to a fuel cell performance optimization methodology combined with simulation and experiment, a device and an electronic device.

BACKGROUND

With the advantages of high energy conversion efficiency, low operating temperature and zero noise, proton exchange membrane fuel cells have broad application prospects in the future new energy vehicle field.

Complex transport processes occur inside the fuel cell, including gas transport (e.g., hydrogen, oxygen, water vapor and nitrogen), water transport (e.g., membrane water, liquid water), and temperature transport, and these processes interact with each other to cause the fuel cell output voltage to depend on the actual operating conditions (e.g., gas flow rate, relative humidity, temperature, pressure). For example, when relative humidity of the gas is low, membrane dehydration may occur inside the fuel cell, resulting in a decrease in proton conductivity and thus an increase in ohmic voltage loss. When the relative humidity of the gas is too high, a large amount of liquid water may appear inside the fuel cell, which hinders the gas transport and reduces the effective electrochemical reaction area, resulting in a decrease in output voltage. As a result, unreasonable operating conditions can reduce the performance of fuel cells, while good operating conditions can make fuel cells perform at their best. Therefore, optimizing the operating conditions of fuel cells is crucial to improve the performance of the product. In order to study the performance optimization method of fuel cells, experimental and simulation methods have been used. The experimental method is used to perform a bench test on the fuel cell product to obtain the product performances. Although the test data are highly reliable, the experiment cost is high and the experiment cycle is long. In addition, the bench test is difficult to visually characterize the water and heat transport processes inside the fuel cell. Simulation method is used to simulate the internal transport process by establishing a fuel cell model to obtain the overall output voltage. Although the simulation model can demonstrate the detailed transport process and the simulation cost is low, the reliability and accuracy of the simulation results are heavily dependent on the calibration of data of the bench test.

SUMMARY

To solve the above technical problems, the present disclosure provides a fuel cell performance optimization methodology combined with simulation and experiment, a device and an electronic device.

In the first aspect, the present embodiment provides a fuel cell performance optimization methodology combined with simulation and experiment, comprising: establishing an initial fuel cell simulation model, and obtaining an initial output voltage by the initial fuel cell simulation model;

performing a bench test on the fuel cell to obtain a plurality of actual output voltages of the fuel cell under a plurality of base operating conditions;

calibrating the initial fuel cell simulation model based on the plurality of actual output voltages to obtain the calibrated fuel cell simulation model;

refining the plurality of the base operating conditions to obtain a plurality of standard operating conditions, and performing fuel cell simulation and analysis on the plurality of standard operating conditions based on the calibrated fuel cell simulation model to obtain a plurality of standard output voltages;

establishing a performance evaluation function of fuel cell and inputting the plurality of standard output voltages into the performance evaluation function of fuel cell to obtain an optimal standard output voltage, and the standard operating condition corresponding to the optimal standard output voltage is used as an optimal operating condition;

performing the bench test based on the optimal operating condition, to obtain an optimal actual output voltage of the fuel cell, and comparing the optimal actual output voltage with the optimal standard output voltage to obtain an output voltage optimization result of the fuel cell.

In a possible implementation of the above first aspect, the initial fuel cell simulation model comprises gas transport simulation, water transport simulation, and temperature transport simulation. In a possible implementation of the above first aspect, the initial output voltage is obtained based on the gas transport simulation, the water transport simulation and the temperature transport simulation.

In a possible implementation of the above first aspect, further comprising: setting a first base operating condition and a second base operating condition for the fuel cell; performing the bench test on the fuel cell based on the first base operating condition and the second base operating condition, respectively, to obtain a first actual output voltage and a second actual output voltage.

In a possible implementation of the above first aspect, further comprising: the initial parameters to be calibrated in the initial fuel cell simulation model are set based on the first base operating condition; the first base operating condition is processed by the initial fuel cell simulation model to obtain the first simulation output voltage; the first actual output voltage is compared with the first simulated output voltage, and when the absolute value $RD_1$ of the maximum relative difference between the first simulated output voltage and the first actual output voltage is greater than 10%, the initial parameters are calibrated to obtain the first parameters; the first parameters are adjusted based on the second base operating condition to obtain the second parameters; the second base operating condition is processed by the initial fuel cell simulation model to obtain the second simulation output voltage; the second actual output voltage is compared with the second simulated output voltage, and when the absolute value $RD_2$ of the maximum relative difference between the second simulated output voltage and the second actual output voltage is greater than 10%, it sets the parameters to be calibrated in the initial fuel cell simulation model as the second parameters, and calibrates the second parameters again based on the first base operating conditions until $RD_1$ is less than or equal to 10%, then completes the calibration, and obtains the calibrated fuel cell simulation model.

In a possible implementation of the above first aspect, further comprising: setting a value range of the base operating conditions based on a value range of stoichiometry [STmin, STmax], a value range of relative humidity [RHmin, RHmax], a value range of temperature [Tmin, Tmax], a value range of pressure [Pmin, Pmax]; based on the value range of the base operating conditions, selecting, by means of linear interpolation, a values of the stoichiometry, b values of the relative humidity, c values of the temperature, q values of the pressure, to obtain G standard operating conditions, wherein a, b, c, q are all positive integers; based on the calibrated fuel cell simulation model, performing simulation and analysis on the fuel cell under each of the G standard operating conditions to obtain G standard output voltages.

In a possible implementation of the above first aspect, further comprising: establishing a performance evaluation function of fuel cell and obtaining G standard output voltage evaluation values based on the G standard output voltages; setting the standard output voltage corresponding to the highest evaluation value of the G standard output voltage evaluation values as the optimal standard output voltage, and using the standard operating condition corresponding to the optimal standard output voltage as the optimal operating condition, wherein the optimal operating condition has a stoichiometry of $Mx1$, a relative humidity of $RHx2$, a temperature of $Tx3$ and a pressure of $Px4$;

the performance evaluation function of fuel cell Fun is expressed as:

$$\begin{cases} \text{Fun} = h \times V_{out}(I_{low}) + e \times V_{out}(I_{mid}) + f \times V_{out}(I_{high}) \\ h + e + f = 1 \end{cases}; \qquad (1)$$

wherein, $V_{out}$ represents output voltage, $I_{low}$, $I_{mid}$, $I_{high}$ represents low current density, medium current density and high current density, respectively, the values of which are determined according to the G standard output voltages, and h, e, f represent performance evaluation weight factors, respectively, the values of which are positive real numbers within a value range of [0, 1].

The optimal operating conditions satisfy the following conditions:

$$Mx1 \in \left\{ ST\min, ST\min + \frac{ST\max - ST\min}{a-1}, \right.$$
$$\left. ST\min + 2 \times \frac{M\max - M\min}{a-1}, \dots, ST\max \right\};$$

$$RHx2 \in \left\{ RH\min, RH\min + \frac{RH\max - RH\min}{b-1}, \right.$$
$$\left. RH\min + 2 \times \frac{RH\max - RH\min}{b-1}, \dots, RH\max \right\};$$

$$Tx3 \in \left\{ T\min, T\min + \frac{T\max - T\min}{c-1}, \right.$$
$$\left. T\min + 2 \times \frac{T\max - T\min}{c-1}, \dots, T\max \right\};$$

$$Px4 \in \left\{ P\min, P\min + \frac{P\max - P\min}{q-1}, \right.$$

-continued
$$P\min + 2 \times \frac{P\max - P\min}{q-1}, \dots, P\max \right\}.$$

In a possible implementation of the above first aspect, further comprising:

the output voltage optimization result is a relationship graph between the output voltages and current density.

In a second aspect, the present embodiment provides a fuel cell performance optimization device combined with simulation and experiment, comprising:

an initial simulation model establishing module configured to establish an initial fuel cell simulation model, and obtain an initial output voltage by the initial fuel cell simulation model;

a base measuring module configured to perform a bench test on a fuel cell to obtain a plurality of actual output voltages of the fuel cell under a plurality of base operating conditions;

a calibration module configured to calibrate the fuel cell simulation model based on the plurality of actual output voltages to obtain the calibrated fuel cell simulation model;

a simulation refinement module configured to refine the plurality of base operating conditions to obtain a plurality of standard operating conditions, and perform fuel cell simulation and analysis on the plurality of standard operating conditions based on the calibrated fuel cell simulation model to obtain a plurality of standard output voltages;

an optimal evaluation module configured to establish a performance evaluation function of fuel cell, and input the plurality of standard output voltages into the performance evaluation function of fuel cell to obtain an optimal standard output voltage, and the standard operating condition corresponding to the optimal standard output voltage is used as an optimal operating condition;

an optimization verification module configured to perform the bench test based on the optimal operating condition to obtain an optimal actual output voltage of the fuel cell, and compare the optimal actual output voltage with the optimal standard output voltage to obtain an output voltage optimization result of the fuel cell.

In a third aspect, the present embodiment provides an electronic device, comprising: a memory used to store instructions executed by one or more processors of a system, and the processor, which is one of the processors of the system, is used to execute fuel cell performance optimization methodology combined with simulation and experiment.

Compared with prior art, with the mutual coupling of simulation method and experimental method, the fuel cell performance optimization methodology combined with simulation and experiment, the device and the electronic device in the present disclosure can reduce the number of experiments and experiment cycles required in the process of fuel cell operating condition optimization, and improve the reliability and accuracy of simulation results, so that the role of simulation method in the optimization process can be better utilized, finally the performance of fuel cell products can be improved with lower experiment costs and shorter development cycles, and forward development of fuel cell is promoted.

DESCRIPTION OF DRAWINGS

FIG. 1 is a schematic diagram of the overall flow of a fuel cell performance optimization methodology combined with simulation and experiment according to an embodiment of the present disclosure.

FIG. 2 is a schematic diagram of the verification and calibration process between the simulation model and the actual output voltage of the fuel cell performance optimization methodology combined with simulation and experiment according to an embodiment of the present disclosure.

FIG. 6A and FIG. 6B are schematic diagrams of output voltages of the fuel cell model under all operating conditions of a fuel cell performance optimization methodology combined with simulation and experiment according to an embodiment of the present disclosure.

FIG. 7 is a schematic diagram of the values of the performance evaluation function of fuel cell under all operating conditions for the fuel cell performance optimization methodology combined with simulation and experiment according to an embodiment of the present disclosure.

DETAILED DESCRIPTION

Figure 3:
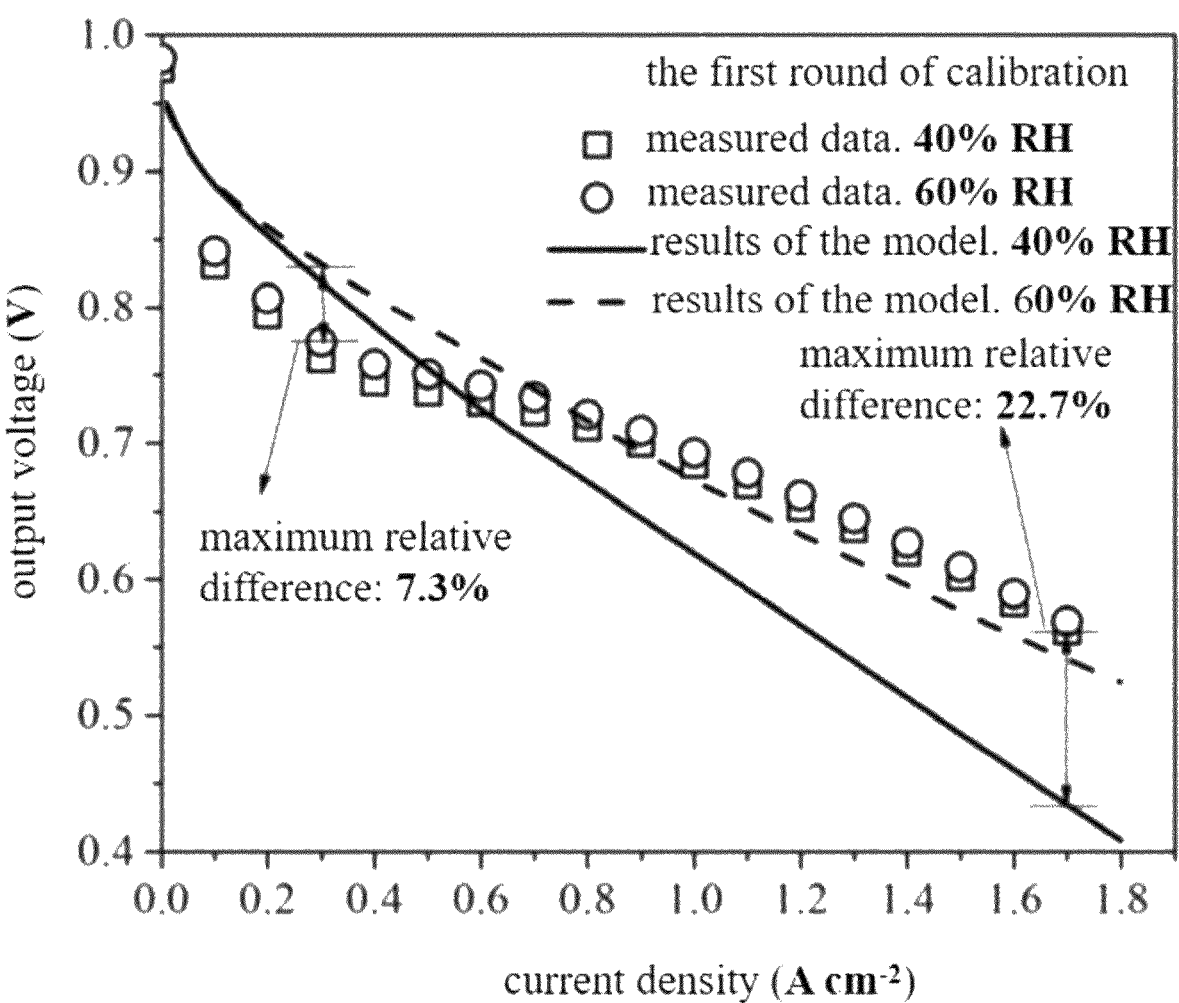
FIG. 3 is a schematic diagram of the first round of calibration between the actual output voltage under the base operating conditions and the simulation model of the fuel cell performance optimization methodology combined with simulation and experiment according to an embodiment of the present disclosure.

Exemplary embodiments of the present disclosure will be described in more detail below with reference to the accompanying drawings. It will be understood that the terms "first", "second", etc., as used in the present disclosure may be used to describe various elements, but unless specifically stated, these elements are not limited by these terms. These terms are used only to distinguish one element from another element. While exemplary embodiments of the disclosure are shown in the accompanying drawings, it should be understood that the disclosure may be implemented in various forms without being limited by the embodiments set forth herein. Rather, these embodiments are provided to enable a more thorough understanding of the disclosure and to enable the full scope of the disclosure to be communicated to those skilled in the art.

Embodiments of the present disclosure will be described in further detail below with reference to the accompanying drawings.

FIG. 1 is a schematic diagram of the overall flow of a fuel cell performance optimization methodology combined with simulation and experiment according to an embodiment of the present disclosure. The specific steps of the method are described below by specific computational embodiments combined with the accompanying drawings.

A fuel cell performance optimization methodology combined with simulation and experiment shown in FIG. 1 comprises:

Step (1): establishing an initial fuel cell simulation model and obtain an initial output voltage by the initial fuel cell simulation model.

Step (2): performing a bench test on a fuel cell to obtain a plurality of actual output voltages of the fuel cell under a plurality of base operating conditions.

Step (3): calibrating the initial fuel cell simulation model based on the plurality of actual output voltages to obtain the calibrated fuel cell simulation model.

Step (4): refining the plurality of base operating conditions to obtain a plurality of standard operating conditions, and performing fuel cell simulation and analysis on the plurality of standard operating conditions based on the calibrated fuel cell simulation model to obtain a plurality of standard output voltages.

Step (5): establishing a performance evaluation function of fuel cell and input the plurality of standard output voltages into the performance evaluation function of fuel cell to obtain an optimal standard output voltage, and the standard operating condition corresponding to the optimal standard output voltage is used as an optimal operating condition.

Step (6): based on the optimal operating condition, performing the bench test to obtain an optimal actual output voltage of the fuel cell, and compare the optimal actual output voltage with the optimal standard output voltage to obtain an output voltage optimization result of the fuel cell.

Specifically, step (1) further includes:

A gas transport simulation is characterized as follows:

$$
\begin{cases}
\dfrac{\partial}{\partial t}(\varepsilon(1 - s_{lq})\rho_g Y_i) = \nabla \cdot \left(\rho_g D_i^{eff} \nabla Y_i\right) + S_i \\
\dfrac{\partial}{\partial t}((1 - s_{lq})\rho_g Y_i) + \nabla \cdot (\rho_g u_g Y_i) = \nabla \cdot \left(\rho_g D_i^{eff} \nabla Y_i\right) + S_i
\end{cases}
\tag{2}
$$

In the expression (2), i represents hydrogen, oxygen, nitrogen and water vapor, $\varepsilon$ represents porosity, $s_{lq}$ represents liquid water volume fraction, $\mu_g$ represents gas density, $Y_j$ represents gas mass fraction, $$
D_i^{eff}
$$

represents effective diffusion coefficient of gas, t represents time, $U_g$ represents a flow rate of gas, $S_i$ represents source term of gas. The expression (2) applies to catalytic layer, micro-porous layer, gas diffusion layer and flow channel.

A water transport simulation is characterized as follows:

$$\frac{\rho_{mem}}{EW}\frac{\partial(\omega\lambda)}{\partial t} = \frac{\rho_{mem}}{EW}\nabla\cdot\left(\omega^{1.5}D_{mw}\nabla\lambda\right) + S_{mw} \tag{3}$$

$$\frac{\partial\left(\varepsilon\rho_{lq}s_{lq}\right)}{\partial t} = \nabla\cdot\left(\rho_{lq}\frac{K_{lq}}{\mu_{lq}}\nabla\rho_l\right) + S_{lq} \tag{4}$$

In expressions (3) and (4), $\mu_{MEM}$ represent proton exchange membrane density, EW represents proton exchange membrane equivalent mass, $\omega$ represents polymer volume fraction, $\lambda$ represents membrane water content, t represents time, $D_{mw}$ represents membrane water diffusion coefficient, $S_{mw}$ represents membrane water source term, $\varepsilon$ represents porosity, $\rho_{lq}$ represents liquid water density, $s_{lq}$ represents liquid water volume fraction, $K_{lq}$ represents liquid water permeability, represents dynamic viscosity, $\mu l$ represents hydraulic pressure, and $S_{lq}$ represents liquid water source term.

A temperature transport simulation is characterized as follows:

$$\frac{\partial}{\partial t}\left((\rho c_p)_{fl,sl}^{eff}T\right) = \nabla\cdot\left(k_{fl,sl}^{eff}\nabla T\right) + S_T \tag{5}$$

In the expression $$(\rho c_p)_{fl,sl}^{eff} \tag{5}$$

represents the effective volumetric heat capacity, T represents the temperature, t represents the time, $$k_{fl,sl}^{eff}$$

represents the effective thermal conductivity, and $S_T$ represents the heat source term.

The initial output voltage in the fuel cell simulation model is as follows:

$$V_{out} = V_{Nernst} - V_{act} - V_{ohmic} - V_{conc} \tag{6}$$

Wherein, $V_{out}$ represents an output voltage, $V_{Nernst}$ represents Nernst voltage, $V_{act}$ represents activation voltage loss, $V_{ohmic}$ represents ohmic voltage loss, $V_{conc}$ represents concentration voltage loss.

The initial output voltage, the Nernst voltage, the activation voltage loss, the ohmic voltage loss, and the concentration voltage loss in the expression (6) are obtained based on the expressions (2), (3), (4), and (5).

In this embodiment, while realizing the performance improvement of fuel cell products, it is possible to characterize the water and heat transport processes inside the fuel cell (e.g., the distribution of physical quantities such as film water, liquid water, and temperature inside the fuel cell) by means of simulation method, so as to explain the mechanism and reasons for the performance improvement and promote forward development of fuel cells.

FIG. 2 is a schematic diagram of the verification and calibration process between the simulation model and the actual output voltage of the fuel cell performance optimization methodology combined with simulation and experiment according to an embodiment of the present disclosure.

Specifically, step (2) further includes: placing the fuel cell product on the fuel cell test bench, and connecting the gas supply pipe and the electronic load, etc. After the gas tightness of the fuel cell product is qualified, it is activated according to the activation operating conditions specified in the product instructions until the activation process is completed.

Based on the test and simulation requirements of the fuel cell, a first base operating condition of the fuel cell is set. The stoichiometry of the first base operating condition is ST1, the relative humidity is RH1, the temperature is T1, and the pressure is P1.

Based on the test and simulation requirements of the fuel cell, a second base operating condition of the fuel cell is set. The stoichiometry of the second base operating condition is ST2, the relative humidity is RH2, the temperature is T2, and the pressure is P2.

The bench test is performed on the fuel cell according to the first base operating condition and the second base operating condition, to obtain a first actual output voltage and a second actual output voltage.

In some embodiments, testing and simulation requirements for the fuel cell are usually selected based on the instruction manual of the fuel cell sample. That is, they can be customized according to the customer's requirements, as long as they are in the operating conditions range of the sample operation, such as temperature range of 60-90, relative humidity range of 40%-100%, etc. Any combination of conditions can be taken from them (e.g., temperature 60 and relative humidity 40%), and they are universal for all conditions.

According to the parameters of the first base operating condition, the test operating condition of a test bench is set, and the fuel cell product is tested, so as to obtain the relationship graph between its output voltage and current density, i.e., the polarization curve performance of the fuel cell under the first base operating condition.

According to the parameters of the second base operating condition, the test operating condition of the test bench is set, ad the fuel cell product is tested, so as to obtain the relationship graph between its output voltage and current density, i.e., the polarization curve performance of the fuel cell under the second base operating condition.

Specifically, step (3) further comprises: corresponding parameters in the simulation model is set based on the measured structure and design parameters of the fuel cell product.

In some embodiments, effective reaction area: 25 cm$^2$; thickness of a polar plate: 2 mm; thickness of a flow channel: 1 mm; thickness of a gas diffusion layer: 0.2 mm; thickness of a micro-porous layer: 0.02 mm; thickness of a catalytic layer: 0.01 mm; thickness of a proton exchange membrane: 0.025 mm.

Density of the polar plate: 1000 kg m$^{-3}$; density of the gas diffusion layer: 1000 kg m$^{-3}$; density of the micro-porous layer: 1000 kg m$^{-3}$; density of catalytic layer: 1000 kg m$^{-3}$; density of the proton exchange membrane: 1980 kg m$^{-3}$.

Specific heat capacity of the polar plate: 1580 J kg$^{-1}$ K$^{-1}$; specific heat capacity of the gas diffusion layer: 2000 J kg$^{-1}$ K$^{-1}$; specific heat capacity of the micro-porous layer: 568 J kg$^{-1}$ K$^{-1}$; specific heat capacity of the catalytic layer: 3300 J kg$^{-1}$ K$^{-1}$; specific heat capacity of the proton exchange membrane: 833 J kg$^{-1}$ K$^{-1}$.

Thermal conductivity of the polar plate: 20 W m$^{-1}$ K$^{-1}$; thermal conductivity of the gas diffusion layer: 1.0 W m$^{-1}$ $K^{-1}$; thermal conductivity of the micro-porous layer: 1.0 W $m^{-1} K^{-1}$; thermal conductivity of the catalytic layer: 1.0 W $m^{-1} K^{-1}$; thermal conductivity of the proton exchange membrane: 0.95 W $m^{-1} K^{-1}$.

Conductivity of polar plate: 20,000 S $m^{-1}$; conductivity of the gas diffusion layer: 300 S $m^{-1}$; conductivity of the micro-porous layer: 300 S $m^{-1}$; conductivity of the catalytic layer: 300 S $m^{-1}$; conductivity of the proton exchange membrane: 300 S $m^{-1}$.

Porosity of the catalytic layer: 0.3; porosity of the micro-porous layer: 0.4; porosity of the gas diffusion layer: 0.6.

Based on the parameters of operating condition 1 in the actual output voltage, the initial parameters in the simulation model are set.

The stoichiometries of the cathode and anode are 2.0, 2.0, respectively.

The inlet gas pressures of cathode and anode are 1.5 atm and 1.3 atm, respectively.

The inlet relative humidity of cathode and anode are 60%, 60%, respectively.

The inlet gas temperatures of the cathode and anode are 80° C. and 80° C., respectively, and the operating temperature of the fuel cell is 80° C. In some embodiments, the first base operating condition is processed by the initial fuel cell simulation model to obtain the first simulation output voltage. The simulation model is calibrated by the polarization curve performance of the first base operating condition in the first simulation actual output voltage, such that when the absolute value $RD_1$ of the maximum relative difference between the first simulation output voltage and the first actual output voltage is greater than 10%, the initial parameters are calibrated to obtain the first parameters.

After calculation, the absolute value of the maximum relative difference between the simulation result of the first base operating condition and the actual output voltage during the first round of model calibration is 7.3%. Here, the corresponding current density is about 0.3 A $cm^{-2}$.

Based on the parameters of the second base operating condition in the actual output voltage, the first parameters are adjusted to obtain second parameters.

The stoichiometries of the cathode and anode are 2.0, 2.0, respectively.

The inlet gas pressures of cathode and anode are 1.5 atm, 1.3 atm, respectively.

The inlet relative humidity of the cathode and anode are 40% and 40%, respectively.

The inlet gas temperatures of the cathode and anode are 80° C., 80° C., respectively, and the operating temperature of the fuel cell is 80° C.

The calibration is performed based on the second simulated output voltage of the simulation model under the second base operating condition, to obtain the model simulation result. Comparing the model simulation result with the second actual output voltage to obtain the absolute value of the maximum relative difference between the second simulated output voltage and the second actual output voltage.

FIG. 3 is the first round of calibration between the actual output voltage under the base operating conditions and the simulation model of the fuel cell performance optimization methodology combined with simulation and experiment according to an embodiment of the present disclosure. In some embodiments, during the first round of model calibration, it is calculated that the absolute value of the maximum relative difference between the second simulated output voltage and the second simulated actual output voltage is 22.7%. The corresponding current density is about 1.7 A $cm^{-2}$.

Since the absolute value of the maximum relative difference between the second simulated output voltage and the second actual output voltage in the second base operating condition is greater than 10%, it is necessary to verify and calibrate the first base operating condition and the second base operating condition again.

In the second round of model calibration, it is calculated that the absolute value of the maximum relative difference between the first simulated output voltage and the first actual output voltage is 3.3% and the absolute value of the maximum relative difference between the second simulated output voltage and the second actual output voltage is 16.2%, so it is necessary to verify and calibrate the first base operating condition and the second base operating condition again.

In the third round of model calibration, it is calculated that the absolute value of the maximum relative difference between the first simulated output voltage and the first actual output voltage is 3.9%, and the absolute value of the maximum relative difference between the second simulated output voltage and the second actual output voltage is 10.4%, so it is necessary to verify and calibrate the first base operating condition and the second base operating condition again.

In the fourth round of model calibration, it is calculated that the absolute value of the maximum relative difference between the first simulated output voltage and the first actual output voltage is 2.9%, and the absolute value of the maximum relative difference between the second simulated output voltage and the second actual output voltage is 13.1%, so it is necessary to verify and calibrate the first base operating condition and the second base operating condition again.

Comparing the second actual output voltage with the second simulated output voltage, when the absolute value $RD_2$ of the maximum relative difference between the second simulated output voltage and the second actual output voltage is greater than 10%, the parameters to be calibrated in the initial fuel cell simulation model are set to be the second parameters. The second parameters are calibrated again based on the first base operating condition until $RD_1$ is less than or equal to 10% to complete the calibration and the calibrated fuel cell simulation model is obtained.

The calculated expressions for the second base operating condition $RD_1$ and $RD_2$ are as follows:

$$RD_i = \left| \frac{ith \text{ simulated output voltage} - ith \text{ actual output voltage}}{ith \text{ actual output voltage}} \right| \times 100\%, \qquad (7)$$

$$i = 1, 2$$

Figure 4:
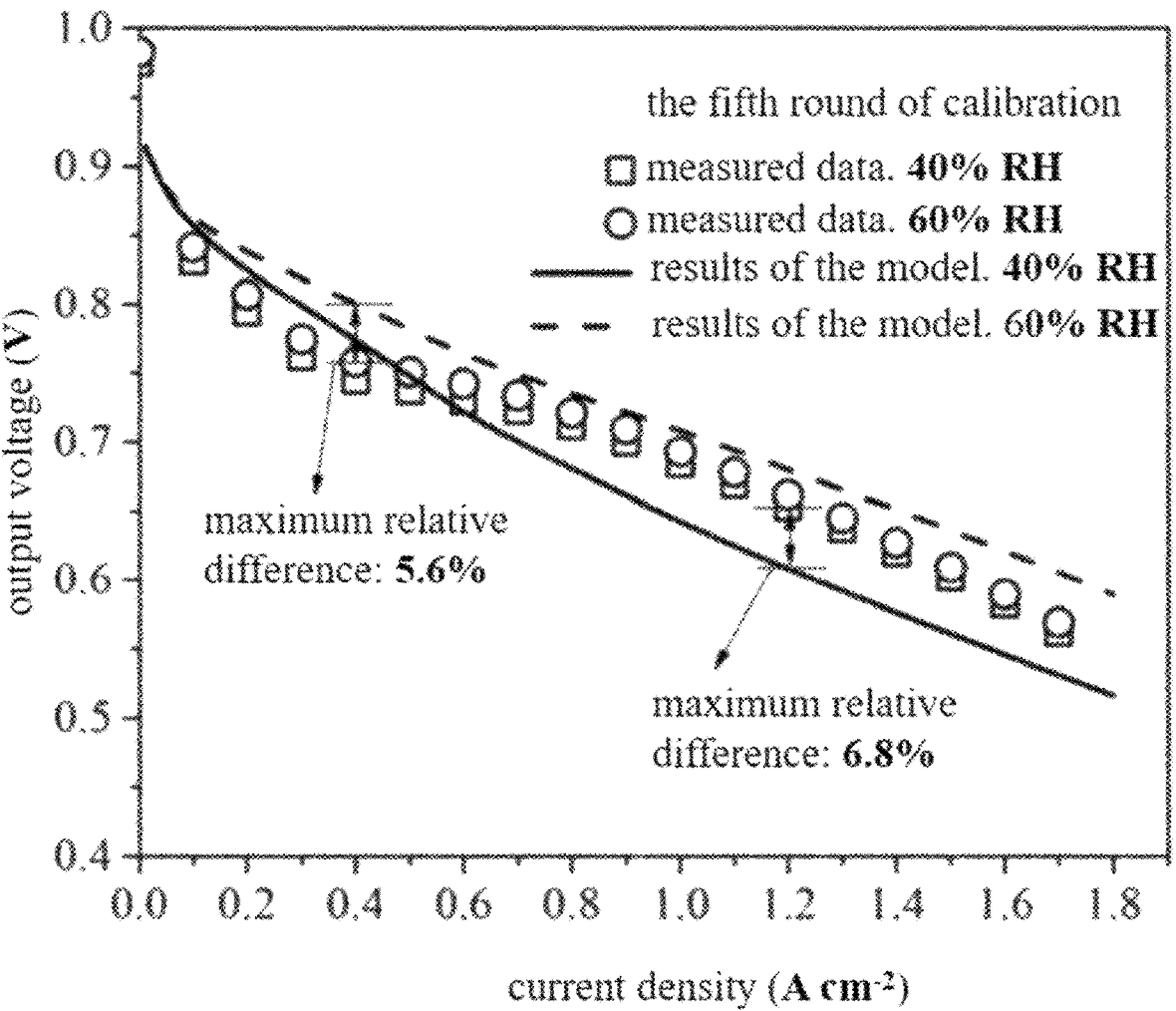
FIG. 4 is a schematic diagram of the fifth round of calibration between the actual output voltage under the base operating conditions and the simulation model of the fuel cell performance optimization methodology combined with simulation and experiment according to the embodiment of the present disclosure.

FIG. 4 is the fifth round of calibration between the actual output voltage under the base operating conditions and the simulation model of the fuel cell performance optimization methodology combined with simulation and experiment according to the embodiment of the present disclosure. In some embodiments, during the fifth round of model calibration, the absolute value of the maximum relative difference between the first simulated output voltage and the first actual output voltage is calculated to be 5.6%. The corresponding current density is about 0.4 A $cm^{-2}$. The absolute value of the maximum relative difference between the second simulated output voltage and the second actual output voltage is 6.8%. The corresponding current density is about 1.2 A cm$^{-2}$.

Figure 5:
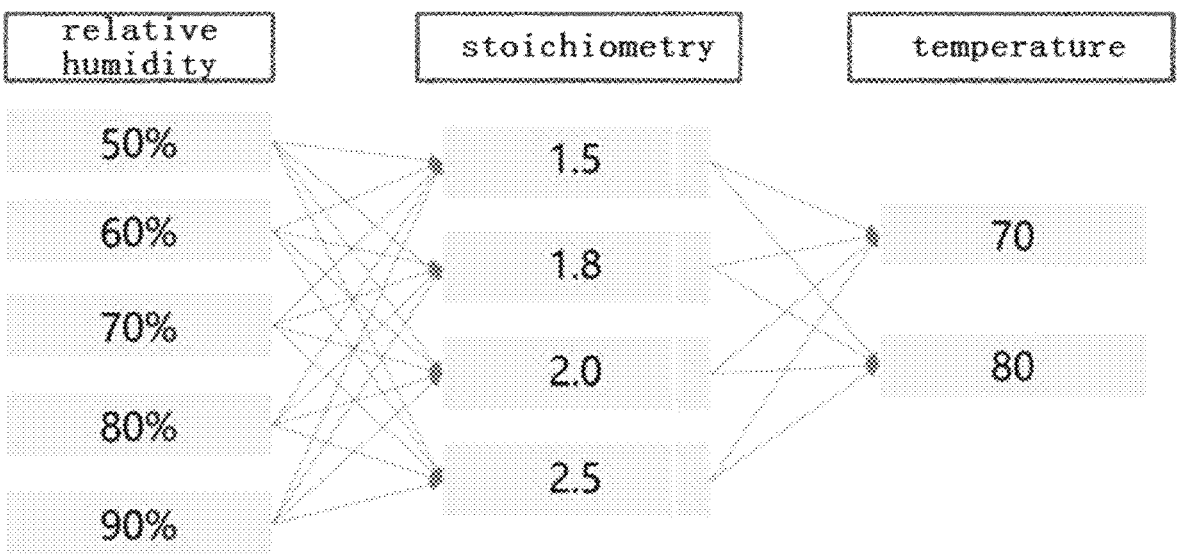
FIG. 5 is a schematic diagram of the values of relative humidity, stoichiometry, and temperature for all operating conditions of a fuel cell performance optimization methodology combined with simulation and experiment according to an embodiment of the present disclosure.

FIG. 5 is a schematic diagram of the values of relative humidity, stoichiometry, and temperature for all operating conditions of a fuel cell performance optimization methodology combined with simulation and experiment according to an embodiment of the present disclosure.

Specifically, in step (4), it performs fuel cell simulation and analysis on G operating conditions based on the calibrated fuel cell simulation model to obtain a plurality of standard output voltages.

The valve of G is a×b×c×q.

The selected values of stoichiometry, relative humidity, temperature, and pressure are:

$$\text{stoichiometry} = \left\{ STmin, STmin + \frac{STmax - STmin}{a-1}, \right.$$
$$STmin + 2 \times \frac{Mmax - Mmin}{a-1}, \ ... \ , STmax \right\};$$

$$\text{relative humidity} = \left\{ RHmin, RHmin + \frac{RHmax - RHmin}{b-1}, \right.$$
$$RHmin + 2 \times \frac{RHmax - RHmin}{b-1}, \ ... \ , RHmax \right\};$$

$$\text{temperature} = \left\{ Tmin, Tmin + \frac{Tmax - Tmin}{c-1}, \right.$$
$$Tmin + 2 \times \frac{Tmax - Tmin}{c-1}, \ ... \ , Tmax \right\};$$

$$\text{pressure} = \left\{ Pmin, Pmin + \frac{Pmax - Pmin}{q-1}, \right.$$
$$Pmin + 2 \times \frac{Pmax - Pmin}{q-1}, \ ... \ , Pmax \right\}.$$

In some embodiments, the operating conditions of the fuel cell are refined to obtain a plurality of standard operating conditions, and it performs fuel cell simulation and analysis on the plurality of standard operating conditions based on the calibrated fuel cell simulation model to obtain a plurality of standard output voltages. Based on the test and simulation requirements of the fuel cell, the value range of the operating conditions in the simulation and analysis is set. The value range of the relative humidity is [50%, 90%], the value range of the stoichiometry is [1.5, 2.5], the value range of the temperature is [70° C., 80° C.], and the values of the pressures at anode and cathode are 1.5 atm, 1.3 atm.

By means of linear interpolation, five values of the relative humidity are selected as 50%, 60%, 70%, 80% and 90%, respectively.

Relative humidity={50%, 60%, 70%, 80%, 90%}

By means of linear interpolation, four values of the stoichiometry are selected are 1.5, 1.8, 2.0 and 2.5 respectively.

stoichiometry={1.5, 1.8, 2.0, 2.5}

By means of linear interpolation, two values of the temperature are selected as 70° C., 80° C., respectively.

temperature={70, 80}

The above operating conditions are arranged and combined in a total of 40 groups.

It performs the fuel cell simulation and analysis on the above 40 operating conditions to obtain the output results of the model.

FIG. 6A and FIG. 6B are schematic diagrams of output voltages of the fuel cell model under all operating conditions of a fuel cell performance optimization methodology combined with simulation and experiment according to an embodiment of the present disclosure.

In some embodiments, h, e, and f in the expression of the performance evaluation function of fuel cell in step (5) represent the performance evaluation weight factors with values of ⅓, ⅓, and ⅓, respectively.

Based on the output results of the model under the above 40 operating conditions, the values of the performance evaluation function are calculated.

Based on the calculation results of the above performance evaluation function of fuel cell, the operating condition corresponding to the maximum evaluation value of the standard output voltage is selected and defined as the optimal operating condition.

In some embodiments, the optimal operating conditions are calculated to have two groups. In the first group, relative humidity is 90%, stoichiometry is 2.5, and temperature is 70° C. In the second group, relative humidity is 80%, stoichiometry is 2.5, and temperature is 80° C.

The performance of the fuel cell under the optimal operating conditions is analyzed. The reason for the performance improvement is that the increase of the relative humidity leads to the improvement of the water transport in the fuel cell, which enhances the proton conductivity and reduces the ohmic loss. Further, the increase in the stoichiometry causes more reaction gas to be supplied to the inside of the fuel cell, so that the activation loss is also reduced.

FIG. 7 is a schematic diagram of the values of the performance evaluation function of fuel cell under all operating conditions for the fuel cell performance optimization methodology combined with simulation and experiment according to an embodiment of the present disclosure.

Specifically, in some embodiments, in step (6), the fuel cell product is placed on the fuel cell test bench, and the gas supply pipe and the electronic load, etc. are connected.

After the gas tightness of the fuel cell product is qualified, the test operating conditions of the test bench are set according to the parameters of the optimal operating conditions. The fuel cell product is tested to obtain the relationship graph between its output voltage and current density.

In this embodiment, with the mutual coupling of simulation method and experimental method, the number of experiments and experiment cycles required in the process of fuel cell operating condition optimization can be reduced, and the reliability and accuracy of simulation results can be improved, so that the role of simulation method in the optimization process can be better utilized, and finally the performance of fuel cell products can be improved with lower experiment costs and shorter development cycles.

Figure 8:
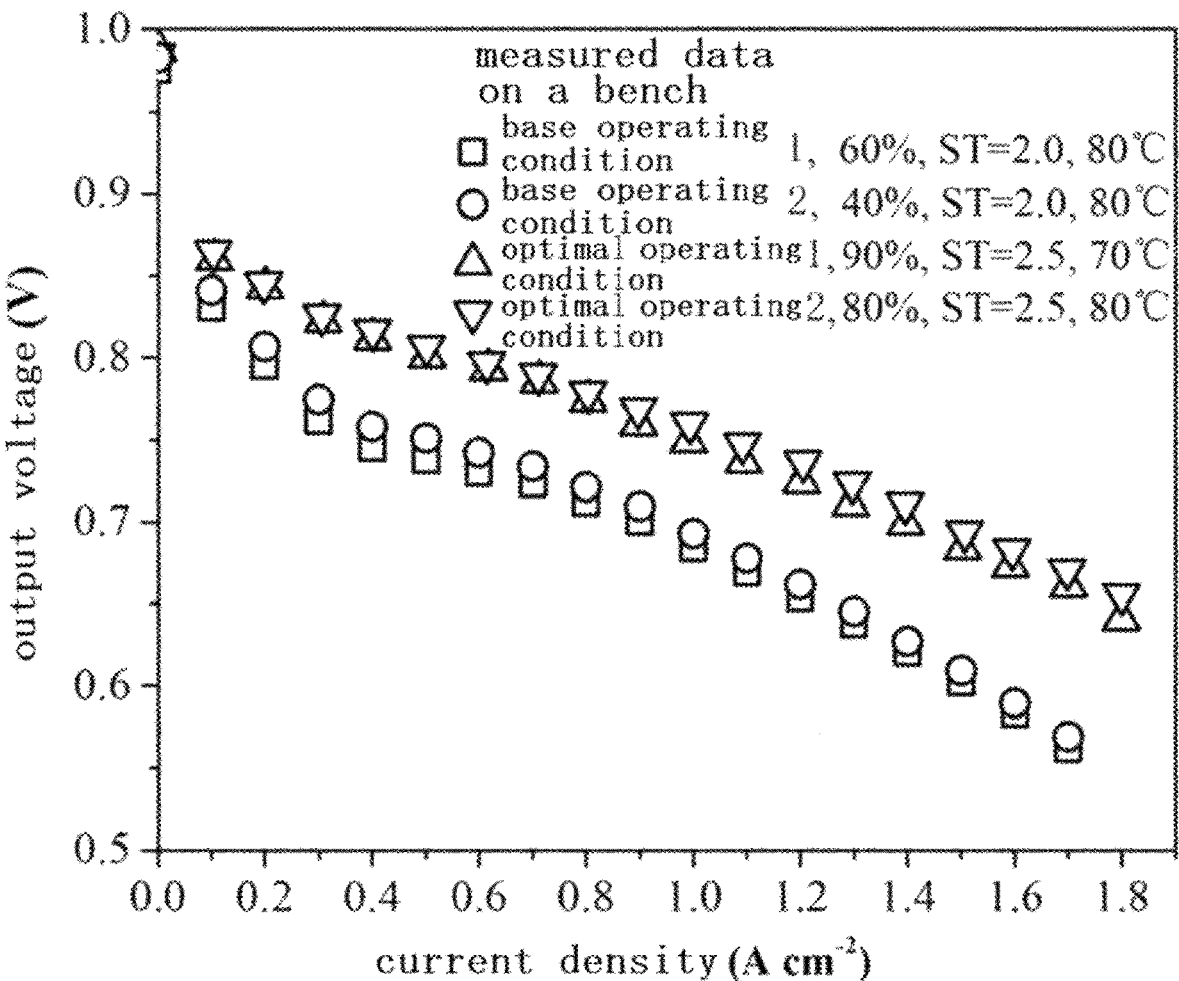
FIG. 8 is a schematic diagram of the polarization curve performances of the fuel cell under the optimal operating conditions and the base operating conditions for the fuel cell performance optimization methodology combined with simulation and experiment according to an embodiment of the present disclosure.

FIG. 8 is a schematic diagram of the polarization curve performances of the fuel cell under the optimal operating conditions and the base operating conditions for the fuel cell performance optimization methodology combined with simulation and experiment according to an embodiment of the present disclosure.

It is calculated that the performance under the optimal operating conditions is improved by 8.4% and 9.7%, respectively, compared with the performance under the base operating conditions according to the values of performance evaluation function of the fuel cell.

The absolute values of the maximum relative differences between simulation model results and the actual output voltages of the fuel cell under the optimal operating conditions are calculated to be 6.1% and 6.9%, respectively.

Figure 9:
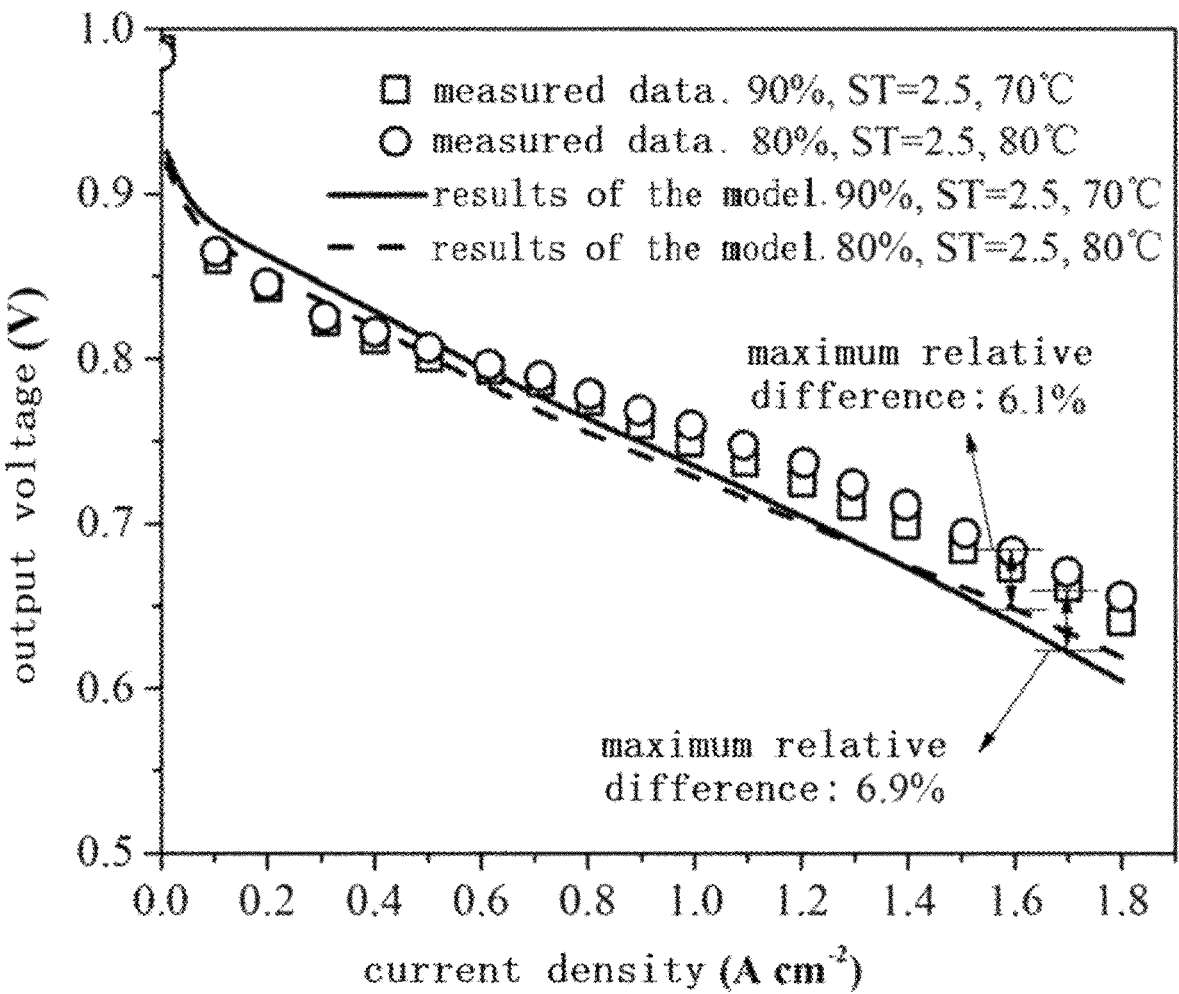
FIG. 9 is a schematic diagram of the comparison between the results of the simulation model and the actual output voltages under optimal operating conditions for the fuel cell performance optimization methodology combined with simulation and experiment according to an embodiment of the present disclosure.

FIG. 9 is a schematic diagram of the comparison between the results of the simulation model and the actual output voltages under optimal operating conditions for the fuel cell performance optimization methodology combined with simulation and experiment according to an embodiment of the present disclosure.

Figure 10:
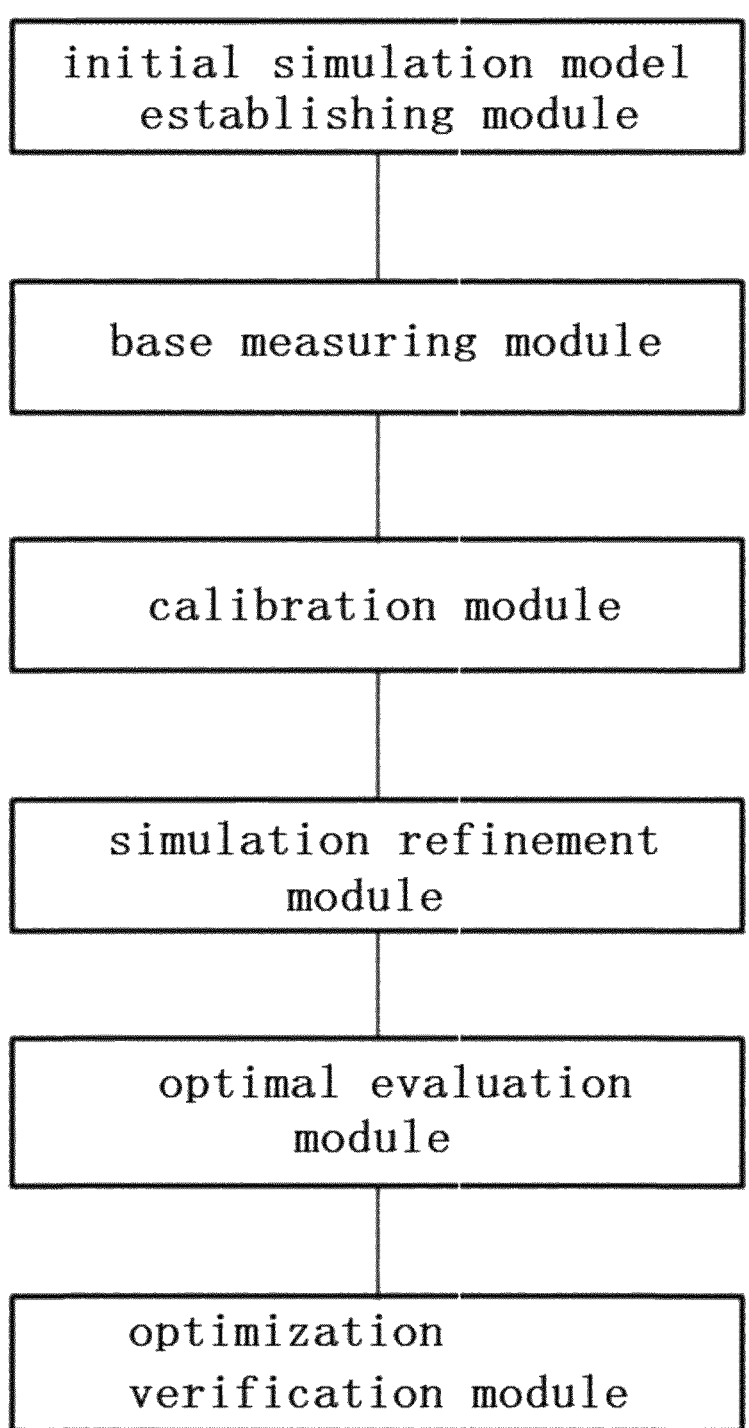
FIG. 10 is a schematic diagram of a fuel cell performance optimization device combined with simulation and experiment according to an embodiment of the present disclosure.

In addition, corresponding to the above performance optimization methodology, FIG. 10 illustrates a fuel cell performance optimization device combined with simulation and experiment. It can be understood that the specific technical details in the above performance optimization methodology are also applicable in this device, and in order to avoid repetition, they are not repeated here.

The fuel cell performance optimization device combined with simulation and experiment comprises:

an initial simulation model establishing module configured to establish an initial fuel cell simulation model, and obtain an initial output voltage by the initial fuel cell simulation model;

a base measuring module configured to perform a bench test on a fuel cell to obtain a plurality of actual output voltages of the fuel cell under a plurality of base operating conditions;

a calibration module configured to calibrate the fuel cell simulation model based on the plurality of actual output voltages to obtain the calibrated fuel cell simulation model;

a simulation refinement module configured to refine the plurality of base operating conditions to obtain a plurality of standard operating conditions, and perform fuel cell simulation and analysis on the plurality of standard operating conditions based on the calibrated fuel cell simulation model to obtain a plurality of standard output voltages;

an optimal evaluation module configured to establish a performance evaluation function of fuel cell, and input the plurality of standard output voltages into the performance evaluation function of fuel cell to obtain an optimal standard output voltage, and the standard operating condition corresponding to the optimal standard output voltage is used as an optimal operating condition;

an optimization verification module configured to perform the bench test based on the optimal operating condition to obtain an optimal actual output voltage of the fuel cell, and compare the optimal actual output voltage with the optimal standard output voltage to obtain an output voltage optimization result of the fuel cell.

Figure 11:
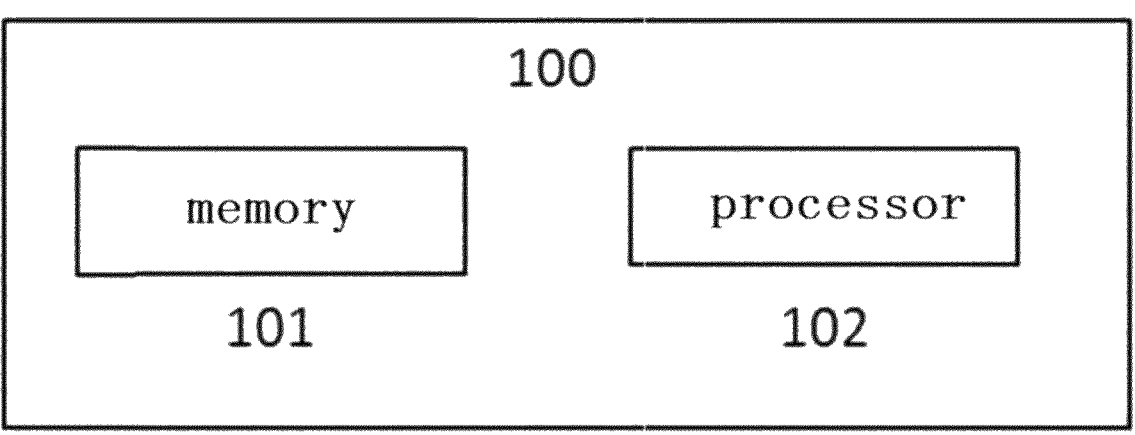
FIG. 11 is a block diagram of the structure of an electronic device according to an embodiment of the present disclosure.

The present disclosure also discloses an electronic device, and FIG. 11 illustrates a block diagram of the structure of an electronic device according to an implementation of the present disclosure. As shown in FIG. 11, the electronic device 100 includes a memory 101 and a processor 102; wherein the memory is used to store instructions executed by one or more processors of the system, and the processor, which is one of the processors of the system, is used to execute the fuel cell performance optimization methodology combined with simulation and experiment.

Flow diagrams are used in the present disclosure to illustrate steps of methods in accordance with embodiments of the present disclosure. It should be understood that the preceding or following steps are not necessarily performed exactly in order. On the contrary, various steps may be handled in reverse order or simultaneously. At the same time, other operations may also be added to these processes.

Those of ordinary skills in the art will appreciate that all or part of the steps of the above-described methods may be completed by a computer program that instructs associated hardware, and the program may be stored in a computer-readable storage medium, such as read only memory, magnetic disk, optical disc, or the like. Optionally, all or part of steps of the above-described embodiments may also be implemented using one or more integrated circuits. Accordingly, the modules/units in the above-described embodiments may be implemented in the form of hardware as well as software functional modules. The present disclosure is not limited to any particular form of combination of hardware and software.

Unless otherwise, all terms used herein have the same meaning as commonly understood by one of ordinary skills in the art to which this disclosure belongs. It will be further understood that terms, such as those in commonly used dictionaries, should be interpreted as having a meaning that is consistent with their meaning in the context of the relevant art and will not be interpreted in an idealized or highly formal sense unless it is clearly defined here in this way.

The foregoing is illustrative of the present disclosure, and is not to be construed as limiting thereof. Although several exemplary embodiments of this disclosure have been described, those skilled in the art will readily appreciate that many modifications are possible in the exemplary embodiments without departing from the novel teachings and advantages of this disclosure. Accordingly, all such modifications are intended to be included within the scope of this disclosure as in the claims. It is to be understood that the foregoing is illustrative of the present disclosure and is not to be considered limited to the specific embodiments disclosed, and that modifications to the disclosed embodiments, as well as other embodiments, are intended to be included within the scope of the appended claims. The present disclosure is by the claims and their equivalents.

In the description of the present specification, reference to the terms "an embodiment," "some embodiments," "illustrative embodiment," "an example," "a particular example," or "some examples" or the like means that a particular feature, structure, material, or characteristic described in connection with the embodiment or example is included in at least one embodiment or example of the present disclosure. In this description, illustrative expressions of such terms do not necessarily refer to the same embodiment or example. Furthermore, the particular features, structures, materials, or characteristics described may be combined in any suitable manner in any one or more embodiments or examples.

The foregoing description is merely illustrative of the preferred embodiments of the present disclosure and is not intended to limit the present disclosure, and any modifications, equivalents, improvements, and the like within the spirit and principles of the present disclosure are intended to be included within the scope of the present disclosure.

What is claimed is:

1. A fuel cell performance optimization methodology combined with simulation, comprising:

establishing an initial fuel cell simulation model, and obtaining an initial output voltage by the initial fuel cell simulation model;

performing a bench test on a fuel cell to obtain a plurality of actual output voltages of the fuel cell under a plurality of base operating conditions;

calibrating the initial fuel cell simulation model based on the plurality of actual output voltages to obtain a calibrated fuel cell simulation model;

refining the plurality of the base operating conditions to obtain a plurality of standard operating conditions, and performing fuel cell simulation and analysis under the plurality of standard operating conditions based on the calibrated fuel cell simulation model to obtain a plurality of standard output voltages;

establishing a performance evaluation function of the fuel cell and inputting the plurality of standard output voltages into the performance evaluation function of the fuel cell to obtain an optimal standard output voltage, and using a standard operating condition corresponding to the optimal standard output voltage as an optimal operating condition; and performing the bench test based on the optimal operating condition, to obtain an optimal actual output voltage of the fuel cell, and comparing the optimal actual output voltage with the optimal standard output voltage to obtain an output voltage optimization result of the fuel cell.

2. The fuel cell performance optimization methodology combined with simulation of claim 1, wherein the initial fuel cell simulation model comprises a gas transport simulation, a water transport simulation, and a temperature transport simulation, and the initial output voltage is obtained based on the gas transport simulation, the water transport simulation and the temperature transport simulation.

3. The fuel cell performance optimization methodology combined with simulation of claim 1, wherein performing the bench test on the fuel cell to obtain the plurality of actual output voltages of the fuel cell under the plurality of base operating conditions comprises:

setting a first base operating condition and a second base operating condition for the fuel cell; and performing the bench test on the fuel cell based on the first base operating condition and the second base operating condition, respectively, to obtain a first actual output voltage and a second actual output voltage.

4. The fuel cell performance optimization methodology combined with simulation of claim 3, wherein calibrating the initial fuel cell simulation model based on the plurality of actual output voltages to obtain the calibrated fuel cell simulation model comprises:

setting initial parameters to be calibrated in the initial fuel cell simulation model based on the first base operating condition, wherein the initial parameters to be calibrated include: stoichiometries of a cathode and an anode, inlet gas pressures of the cathode and the anode, inlet relative humidity of the cathode and the anode, inlet gas temperatures of the cathode and the anode, and an operating temperature of the fuel cell;

processing the first base operating condition by the initial fuel cell simulation model to obtain a first simulation output voltage;

comparing the first actual output voltage with the first simulation output voltage, and when an absolute value $(RD_1)$ of a maximum relative difference between the first simulation output voltage and the first actual output voltage is greater than 10%, calibrating the initial parameters to be calibrated to obtain first parameters;

adjusting the first parameters based on the second base operating condition to obtain second parameters;

processing the second base operating condition by the initial fuel cell simulation model to obtain a second simulation output voltage; and comparing the second actual output voltage with the second simulation output voltage, and when an absolute value $(RD_2)$ of a maximum relative difference between the second simulation output voltage and the second actual output voltage is greater than 10%, setting first parameters to be calibrated in the initial fuel cell simulation model as the second parameters, and calibrating the second parameters again based on the first base operating condition until $RD_1$ is less than or equal to 10%, then completing the calibrating of the second parameters, and obtaining the calibrated fuel cell simulation model.

5. The fuel cell performance optimization methodology combined with simulation of claim 1, wherein refining the plurality of the base operating conditions to obtain the plurality of standard operating conditions, and performing the fuel cell simulation and analysis under the plurality of standard operating conditions based on the calibrated fuel cell simulation model to obtain the plurality of standard output voltages comprises:

setting a value range of the base operating conditions based on a value range of stoichiometries [STmin, STmax], a value range of relative humidity [RHmin, RHmax], a value range of temperatures [Tmin, Tmax], a value range of pressures [Pmin, Pmax];

based on the value range of the base operating conditions, selecting, by means of linear interpolation, a values of the stoichiometries, b values of the relative humidity, c values of the temperatures, q values of the pressures-, to obtain G standard operating conditions, wherein a, b, c, q are all positive integers; and based on the calibrated fuel cell simulation model, performing the fuel cell simulation and analysis under each of the G standard operating conditions to obtain G standard output voltages.

6. The fuel cell performance optimization methodology combined with simulation of claim 5, wherein establishing the performance evaluation function of the fuel cell and inputting the plurality of standard output voltages into the performance evaluation function of the fuel cell to obtain the optimal standard output voltage, and using the standard operating condition corresponding to the optimal standard output voltage as the optimal operating condition, comprises:

establishing the performance evaluation function of the fuel cell and obtaining G standard output voltage evaluation values based on the G standard output voltages;

setting a standard output voltage corresponding to a highest evaluation value of the G standard output voltage evaluation values as the optimal standard output voltage, and using the standard operating condition corresponding to the optimal standard output voltage as the optimal operating condition, wherein the optimal operating condition has a stoichiometry of Mx1, a relative humidity of RHx2, a temperature of Tx3, and a pressure of Px4; wherein the performance evaluation function of the fuel cell Fun is expressed as:

$$\begin{cases} \text{Fun} = h \times V_{out}(l_{low}) + e \times V_{out}(l_{mid}) + f \times V_{out}(l_{high}) \\ h + e + f = 1 \end{cases} ; \qquad (1)$$

wherein, $V_{out}(l_{low})$ represents an standard output voltage under a low current density, $V_{out}(l_{mid})$ represents an standard output voltage under a middle current density, $V_{out}(l_{high})$ represents an standard output voltage under a high current density, values of $V_{out}(l_{low})$, $V_{out}(l_{mid})$, and $V_{out}(l_{high})$ are determined according to the G standard output voltages, and h, e, and f represent performance evaluation weight factors, respectively, values of h, e, and f are positive real numbers within a value range of [0, 1], and the optimal operating condition satisfies following conditions:

$$RHx2 \in \left\{ RH\min, RH\min + \frac{RH\max - RH\min}{b-1}, \right.$$

$$RH\min + 2 \times \frac{RH\max - RH\min}{b-1}, \ldots, RH\max \left. \right\};$$

$$Tx3 \in \left\{ T\min, T\min + \frac{T\max - T\min}{c-1}, \right.$$

-continued $$\left. T\min + 2 \times \frac{T\max - T\min}{c-1}, \ldots, T\max \right\}; \text{ and}$$

$$Px4 \in \left\{ P\min, P\min + \frac{P\max - P\min}{q-1}, \right.$$

$$\left. P\min + 2 \times \frac{P\max - P\min}{q-1}, \ldots, P\max \right\}.$$

7. The fuel cell performance optimization methodology combined with simulation of claim 1, wherein the output voltage optimization result includes a relationship graph between the plurality of actual output voltages and current density and a relationship graph between the plurality of optimal actual output voltages and the current density.

8. An electronic device, comprising: a memory used to store instructions executed by one or more processors of a system, and a processor, which is one of the one or more processors of the system, is used to execute methodology of claim 1.

\* \* \* \* \*